(12) United States Patent
Dole et al.

(10) Patent No.: US 12,270,423 B2
(45) Date of Patent: Apr. 8, 2025

(54) CONTROLLER FOR HYDRAULIC APPARATUS

(71) Applicant: ARTEMIS INTELLIGENT POWER LIMITED, Loanhead Midlothian (GB)

(72) Inventors: Alexis Dole, Nordborg (DK); Matthew Green, Nordborg (DK); John Hutcheson, Nordborg (DK); Daniel Abrahams, Nordborg (DK); Niall Caldwell, Nordborg (DK)

(73) Assignee: Artemis Intelligent Power Limited, Loanhead (GB)

( * ) Notice: Subject to any disclaimer, the term of this patent is extended or adjusted under 35 U.S.C. 154(b) by 0 days.

(21) Appl. No.: 18/259,710

(22) PCT Filed: Dec. 30, 2021

(86) PCT No.: PCT/GB2021/053444
§ 371 (c)(1),
(2) Date: Jun. 28, 2023

(87) PCT Pub. No.: WO2022/144548
PCT Pub. Date: Jul. 7, 2022

(65) Prior Publication Data
US 2024/0068494 A1  Feb. 29, 2024

(30) Foreign Application Priority Data

Dec. 30, 2020  (EP) ...................... 20217931
Oct. 29, 2021  (GB) ...................... 2115620
Nov. 5, 2021   (GB) ...................... 2115963

(51) Int. Cl.
*F15B 21/14*  (2006.01)
*B66F 9/22*   (2006.01)
(Continued)

(52) U.S. Cl.
CPC .............. *F15B 21/082* (2013.01); *B66F 9/22* (2013.01); *E02F 9/2217* (2013.01);
(Continued)

(58) Field of Classification Search
CPC .......... F15B 1/024; F15B 21/14; E02F 9/2217
See application file for complete search history.

(56) References Cited

U.S. PATENT DOCUMENTS 7,444,809 B2  11/2008  Smith et al.
8,726,645 B2   5/2014  Shang et al.
(Continued)

FOREIGN PATENT DOCUMENTS

EP  2 795 003  1/2017
EP  3 301 062  4/2018
(Continued)

OTHER PUBLICATIONS

Thompson, et al. "Swing Energy Recuperation Scheme for Hydraulic Excavators," SAE Technical Paper 2014-01-2402, Sep. 30, 2014, 6 pages, doi:10.4271/2014-01-2402.
(Continued)

*Primary Examiner* — Michael Leslie
(74) *Attorney, Agent, or Firm* — HSML P.C.

(57) ABSTRACT

The present invention provides a controller for hydraulic apparatus (100). The controller is configured to determine (310) that an energy return criteria has been met by movement of a first movement component of a first hydraulic actuator. In response thereto, the controller is further configured to select (320) at least one among a plurality of energy control strategies based on at least one operational characteristic of the hydraulic apparatus, and to control (330) the hydraulic apparatus to implement the energy control strategy during movement of the first movable component in such a way as to meet the energy return
(Continued)

criteria. The plurality of energy control strategies comprises a first energy control strategy and a second energy control strategy. The at least one operational characteristic of the hydraulic apparatus comprises an indication of an expected energy recovery of one or more of the energy control strategies. The first energy control strategy comprises transferring energy from the first hydraulic actuator, via a hydraulic machine, to an energy consumer in torque connection with the hydraulic machine. The second energy control strategy comprises transferring energy from the first hydraulic actuator to a low-pressure reservoir of hydraulic fluid in the hydraulic circuit.

19 Claims, 4 Drawing Sheets

(51) Int. Cl.
  *E02F 9/22* (2006.01)
  *F15B 1/02* (2006.01)
  *F15B 11/16* (2006.01)
  *F15B 11/17* (2006.01)
  *F15B 21/08* (2006.01)

(52) U.S. Cl.
  CPC .......... *E02F 9/2292* (2013.01); *E02F 9/2296* (2013.01); *F15B 1/024* (2013.01); *F15B 11/165* (2013.01); *F15B 11/17* (2013.01); *F15B 21/14* (2013.01); *F15B 2211/2656* (2013.01); *F15B 2211/41518* (2013.01); *F15B 2211/71* (2013.01)

(56) References Cited

U.S. PATENT DOCUMENTS

| | | | | |
|---|---|---|---|---|
| 9,290,911 | B2* | 3/2016 | Ma | F15B 1/024 |
| 11,022,911 | B2* | 6/2021 | Lavigne | G03G 21/1676 |
| 11,377,814 | B2* | 7/2022 | Kim | E02F 9/2217 |
| 11,795,661 | B2* | 10/2023 | Sahlman | E02F 9/123 |
| 11,851,843 | B2* | 12/2023 | Jung | E02F 9/2217 |
| 11,892,014 | B2* | 2/2024 | Jung | E02F 9/2292 |
| 11,913,477 | B2* | 2/2024 | Hutcheson | F15B 11/16 |
| 11,959,252 | B2* | 4/2024 | Caldwell | F15B 11/042 |
| 2014/0119868 | A1 | 5/2014 | Wen et al. | |
| 2019/0234049 | A1 | 8/2019 | Meitinger et al. | |
| 2023/0250616 | A1* | 8/2023 | Dumnov | F15B 11/165 60/413 |

FOREIGN PATENT DOCUMENTS

| | | |
|---|---|---|
| EP | 2 947 332 | 10/2018 |
| WO | 2018/067017 | 4/2018 |
| WO | 2019/093537 | 5/2019 |

OTHER PUBLICATIONS

Heybroek, "Saving Energy in Construction Machinery using Displacement Control Hydraulics: Concept Realization and Validation", Linköping Studies in Science and Technology Thesis No. 1372, Linköping University, 2008, 128 pages.

International Search Report and Written Opinion issued in International Application No. PCT/GB2021/053444, Apr. 5, 2022, 16 pages.

* cited by examiner

CONTROLLER FOR HYDRAULIC APPARATUS

FIELD OF THE INVENTION

The present invention relates to a controller for a hydraulic apparatus, such as a vehicle, and to a method of controlling such hydraulic apparatus.

BACKGROUND TO THE INVENTION

It is known to store and transfer energy using hydraulic systems. It is also known to use energy stored in hydraulic systems to do work, such as to operate tools of a vehicle.

In one example, energy transferred from a hydraulic system is used to drive propulsion of a vehicle using a hydraulic transmission. An energy storage component in the form of a hydraulic accumulator can sometimes be provided in the hydraulic system to allow energy from the hydraulic transmission to be recovered (sometimes referred to as energy regeneration) and stored in the accumulator during braking. The energy can be supplied back to the hydraulic transmission by connecting the accumulator directly to the hydraulic transmission.

Energy can be exchanged between a rotatable shaft and a hydraulic circuit via a hydraulic machine. Commonly, the hydraulic machine is connected to a prime mover to allow energy to be provided to the hydraulic circuit from the prime mover via the hydraulic machine. The hydraulic machine defines a plurality of working chambers in the hydraulic circuit, each working chamber partially defined by a movable working surface mechanically connected to the rotatable shaft.

Electronically commutated hydraulic machines are known in which the displacement of working fluid by each working chamber is controlled for each individual cycle of working chamber volume by the active control, in phased relation with cycles of working chamber volume, of at least low-pressure valves which connect each working chamber to a low-pressure manifold and in some embodiments (for example if the machines are to function as motors) high-pressure valves which connect each working chamber to a high-pressure manifold. Such machines can respond rapidly to changes in demand and can very closely match output to a fluctuating demand signal.

It is in this context that the present invention has been devised.

SUMMARY OF THE INVENTION

In accordance with an aspect of the present invention, there is provided a controller for a hydraulic apparatus. The hydraulic apparatus comprises: a prime mover; a hydraulic circuit through which hydraulic fluid can flow; and a hydraulic machine having a rotatable shaft in driven engagement with the prime mover and defining a plurality of working chambers in the hydraulic circuit. Each working chamber is defined partially by a movable working surface mechanically coupled to the rotatable shaft. The hydraulic machine is (e.g. configured) to exchange energy with the hydraulic circuit and the prime mover by movement of the working surfaces and the rotatable shaft. The hydraulic apparatus further comprises a first hydraulic actuator in the hydraulic circuit, in fluid communication with at least one of the plurality of working chambers and comprising a first movable component. The first hydraulic actuator is (e.g. configured) to transfer energy to the hydraulic circuit by movement of the first movable component. The hydraulic apparatus further comprises a plurality of routing valves in the hydraulic circuit for selectively routing the hydraulic fluid between one or more of: at least one of the plurality of working chambers; and the first hydraulic actuator. The controller is configured to determine that an energy return criteria has been met by the first hydraulic actuator and, in response thereto, select at least one among a plurality of energy control strategies to transfer the energy from the first hydraulic actuator via the hydraulic circuit based on at least one operational characteristic of the hydraulic apparatus; and control at least one of the hydraulic machine and the plurality of routing valves to implement the selected at least one energy control strategy. The implementation of the at least one energy control strategy may be done during movement of the first movable component, the movement of the first movable component in such a way as to meet the energy return criteria. The plurality of energy control strategies comprises a first energy control strategy and a second energy control strategy. The first energy control strategy comprises transferring energy from the first hydraulic actuator, via the hydraulic machine, to an energy consumer in torque connection with the hydraulic machine. The second energy control strategy comprises transferring energy from the first hydraulic actuator to a low-pressure reservoir of hydraulic fluid in the hydraulic circuit.

Thus, the hydraulic apparatus can be controlled to transfer (e.g. regenerate) energy from the first hydraulic actuator in at least one of several different ways. The controller can select the at least one energy control strategy (e.g. an energy recovery strategy) to implement based on an operational characteristic of the hydraulic apparatus, such as an availability of one or more of the energy control strategies. In this way, a different energy control strategy can be chosen depending on the operational characteristic. In one example, the at least one energy control strategy is selected based on an indication of an expected energy recovery (e.g. the peak rate, or duration of energy recovery) of one or more (e.g. a plurality) of the energy control strategies. In this way, it will be understood that the at least one operational characteristic of the hydraulic apparatus may comprise (or may be) the indication of an expected energy recovery of one or more of the energy control strategies.

Whilst the controller is capable of implementing any one or more than one of the plurality of energy control strategies, the controller is nevertheless configured to select from among the plurality of energy control strategies, for example to select the first energy control strategy, to select the second energy control strategy, or to select the first and second energy control strategies.

It will be understood that an energy control strategy is substantially any control logic to be applied by the controller to operate at least one of: one or more of the plurality of routing valves and the hydraulic machine, to control the transfer of energy from the first hydraulic actuator through and out of the hydraulic circuit.

The controller may comprise one or more processors and a memory configured to store instructions which when executed by the one or more processors cause the hydraulic apparatus to carry out the functions of the controller described herein. The memory may be non-transitory, computer-readable memory. The memory may have the instructions stored thereon. The present invention extends to a non-transitory computer-readable medium (e.g. memory) having the instructions stored thereon to control the apparatus as described herein. The memory may be solid-state memory. The processor, and the memory may be constituted by electronic circuitry. The processor may comprise one or more integrated circuits. The processor may comprise one or more microprocessors.

Viewed from another aspect, there is provided a method of controlling a hydraulic apparatus. The hydraulic apparatus comprises: a prime mover; a hydraulic circuit through which hydraulic fluid can flow; and a hydraulic machine having a rotatable shaft in driven engagement with the prime mover and defining a plurality of working chambers in the hydraulic circuit. Each working chamber is defined partially by a movable working surface mechanically coupled to the rotatable shaft. The hydraulic machine is (e.g. configured) to exchange energy with the hydraulic circuit and the prime mover by movement of the working surfaces and the rotatable shaft. The hydraulic apparatus further comprises a first hydraulic actuator in the hydraulic circuit, in fluid communication with at least one of the plurality of working chambers and comprising a first movable component. The first hydraulic actuator is (e.g. configured) to transfer energy to the hydraulic circuit by movement of the first movable component. The hydraulic apparatus further comprises a plurality of routing valves in the hydraulic circuit for selectively routing the hydraulic fluid between one or more of: at least one of the plurality of working chambers; and the first hydraulic actuator. The method comprises: determining that an energy return criteria has been met by the first hydraulic actuator and, in response thereto, selecting at least one among a plurality of energy control strategies to transfer the energy from the first hydraulic actuator via the hydraulic circuit based on at least one operational characteristic of the hydraulic apparatus; and controlling at least one of the hydraulic machine and the plurality of routing valves to implement the selected at least one energy control strategy during movement of the first movable component. The movement of the first movable component is in such a way as to meet the energy return criteria. The plurality of energy control strategies comprises a first energy control strategy and a second energy control strategy. The first energy control strategies comprises transferring energy from the first hydraulic actuator, via the hydraulic machine, to an energy consumer in torque connection with the hydraulic machine. The second energy control strategy comprises transferring energy from the first hydraulic actuator to a low-pressure reservoir of hydraulic fluid in the hydraulic circuit.

Thus, there is provided a method of controlling the hydraulic apparatus to transfer (e.g. regenerate) energy from the first hydraulic actuator in one of several different ways, selecting the at least one energy control strategy (e.g. an energy recovery strategy) to implement based on an operational characteristic of the hydraulic apparatus, such as an availability of one or more of the energy control strategies. In this way, a different energy control strategy can be chosen depending on the operational characteristic. In one example, the at least one energy control strategy is selected based on an indication of an expected energy recovery of one or more (e.g., a plurality) of the energy control strategies. In this way, it will be understood that the at least one operational characteristic of the hydraulic apparatus may comprise (or may be) the indication of an expected energy recovery of one or more of the energy control strategies.

The indication of an expected energy recovery of one or more of the energy control strategies may be the indication of the expected energy recovery of at least the selected energy control strategy. Thus, the energy recovery expected by using a given energy control strategy can be used to decide to select that given energy control strategy for use. The indication of an expected energy recovery of one or more of the energy control strategies may be the indication of the expected energy recovery of each of the plurality of energy control strategies.

The controller may be further configured to determine the indication of the expected energy recovery. The method may further comprise determining the indication of the expected energy recovery. It may be that the controller is configured to determine the expected energy recovery, or the method may further comprise determining the expected energy recovery.

The indication of the expected energy recovery may be determined subsequent to determining that the energy return criteria has been met. The indication of the expected energy recovery may be determined in response to determining that the energy return criteria has been met.

It will be understood that the expected energy recovery is the amount of energy which can be re-used from the energy released by movement of the first movable component in such a way as to meet the energy return criteria. The indication of the expected energy recovery may be the efficiency of the one or more energy control strategies.

The volume of the working chamber may vary cyclically with rotation of the rotatable shaft.

The invention may relate particularly to electronically commutated hydraulic machines which intersperse active cycles of working chamber volume, where there is a net displacement of hydraulic working fluid, with inactive cycles of working chamber volume, where there is no net displacement of hydraulic working fluid between the working chamber and the hydraulic circuit. Typically, the majority or all of the active cycles are full stroke cycles, in which the working chambers displace a predetermined maximum displacement of working fluid by suitable control of the timing of valve actuation signals. It is also known to regulate low- and optionally high-pressure valves of one or more of the plurality of working chambers to regulate the fraction of maximum displacement made during an active cycle by operating so-called part stroke cycles. However, such machines typically intersperse active and inactive cycles, with the active cycles being full stroke cycles, with the fraction of cycles which are active cycles (the active cycle fraction) varied to achieve a demanded fractional displacement, instead of operating with only part stroke cycles.

The controller may be configured (e.g. programmed) to control the low- and optionally high-pressure valves of the working chambers to cause each working chamber to carry out either an active or an inactive cycle of working chamber volume during each cycle of working chamber volume.

By 'active cycles' we refer to cycles of working chamber volume which make a net displacement of working fluid. By 'inactive cycles' we refer to cycles of working chamber volume which make no net displacement of working fluid (typically where one or both of the low-pressure valve and high-pressure valve remain closed throughout the cycle). Typically, active and inactive cycles are interspersed to meet the demand indicated by a demand signal. This contrasts with machines which carry out only active cycles, the displacement of which may be varied.

The demand signal for one or more working chambers of the hydraulic machine is typically processed as a 'displacement fraction', Fd, being a target fraction of maximum displacement of working hydraulic fluid per rotation of the rotatable shaft. A demand expressed in volumetric terms (volume of working hydraulic fluid per second) can be converted to displacement fraction taking into account the current speed of rotation of the rotatable shaft and the number of working chambers connected in a group to the same high pressure manifold and one or more hydraulic components (e.g. the hydraulic actuator) of the hydraulic apparatus. The demand signal relates to a demand for the combined fluid displacement of the group of one or more working chambers fluidically connected to the said one or more hydraulic components of the hydraulic apparatus via the hydraulic circuit. There may be other groups of one or more working chambers fluidically connected to one or more other hydraulic components having respective demand signals.

It may be that at least the low-pressure valves (optionally the high-pressure valves, optionally both the low-pressure valves and the high-pressure valves) are electronically controlled valves, and the controller or a further controller is configured to control the (e.g. electronically controlled) valves in phased relationship with cycles of working chamber volume to thereby determine the net displacement of hydraulic fluid by each working chamber on each cycle of working chamber volume. The method may comprise controlling the (e.g. electronically controlled) valves in phased relationship with cycles of working chamber volume to thereby determine the net displacement of hydraulic fluid by each working chamber on each cycle of working chamber volume.

Groups of one or more working chambers may be dynamically allocated to respective groups of one or more hydraulic components in the hydraulic circuit (e.g. the first hydraulic actuator) to thereby change which one or more working chambers are connected to (e.g. a group of) hydraulic components, for example by opening or closing electronically controlled valves (e.g. high-pressure valves and low-pressure valves, described herein), e.g. under the control of a controller. Groups of (e.g. one or more) working chambers may be dynamically allocated to (respective) groups of (e.g. one or more) hydraulic components to thereby change which working chambers of the machine are coupled to which hydraulic components, for example by opening and/or closing (e.g. electronically controlled) valves, e.g. under the control of the or a further controller. The net displacement of hydraulic fluid through each working chamber (and/or each hydraulic component) can be regulated by regulating the net displacement of the working chamber or chambers which are connected to the hydraulic component or components. Groups of one or more working chambers are typically connected to a respective group of one or more said hydraulic components through a said manifold.

It may be that the rate of flow of hydraulic fluid accepted by, or output by, each working chamber is independently controllable. It may be that the flow of hydraulic fluid accepted by, or produced by, each working chamber can be independently controlled by selecting the net displacement of hydraulic fluid by each working chamber on each cycle of working chamber volume. This selection is typically carried out by the controller.

Typically, the hydraulic machine is operable as a pump, in a pump operating mode or is operable as a motor in a motor operating mode. It may be that some of the working chambers of the hydraulic machine may pump (and so some working chambers may output hydraulic fluid) while other working chambers of the hydraulic machine may motor (and so some working chambers may input hydraulic fluid).

The rotatable shaft of the hydraulic machine may be mechanically connected to a further component to be driven by rotation of the rotatable shaft. The further component may be a propulsion component. The further component may be a power take-off output.

The energy consumer may be the prime mover. Thus, in the first energy control strategy, the load torque provided by the prime mover when it is unloaded or offloaded, can be partially or completely met by the driving torque of the hydraulic machine motoring the shaft. Where the prime mover is a combustion engine, this unloading or offloading may allow defueling of the prime mover. In other examples, the energy consumer may be a component other than the prime mover, in torque connection with the hydraulic machine. In other examples, in addition to the energy consumer, there may be an additional torque connected load or loads (which thus act as one or more additional energy consumers).

The movable component may be (e.g. configured) to be mechanically connected to a further movable component of a device in which the hydraulic apparatus is provided. The further movable component may be a lifting arm.

The apparatus may further comprise a further component clutch between the further component and the hydraulic machine to selectively decouple rotation of the rotatable shaft from the further component. In some examples, the further component clutch may only partially decouple rotation of the rotatable shaft from the further component. In other words, some energy may be transferred between the rotatable shaft and the further component via the further component clutch, even when the further component clutch partially decouples rotation of the rotatable shaft from the further component. Thus, even where the rotatable shaft of the hydraulic machine is rotating at high speed, this need not result in high speed rotation of a shaft of the further component, which may damage the further component. In this way, the efficiency and integrity of the hydraulic apparatus can be improved.

The apparatus may further comprise a prime mover clutch between the prime mover and the hydraulic machine to selectively decouple rotation of the rotatable shaft from the prime mover. In some examples, the prime mover clutch may only partially decouple rotation of the rotatable shaft from the prime mover. In other words, some energy may be transferred between the rotatable shaft and the prime mover via the prime mover clutch, even when the prime mover clutch partially decouples rotation of the rotatable shaft from the prime mover. Thus, even where the rotatable shaft of the hydraulic machine is rotating at high speed, this need not result in high speed rotation of a shaft of the prime mover, which may negatively affect fuel efficiency of the prime mover, or may even damage the prime mover. In this way, the efficiency and integrity of the hydraulic apparatus can be improved.

The hydraulic apparatus may comprise an energy storage component. The plurality of energy control strategies may comprise a third energy control strategy. The third energy control strategy may comprise transferring energy from the first hydraulic actuator to the energy storage component via the hydraulic circuit. Thus, the energy from the first hydraulic actuator can be stored for later use in the energy storage component.

The energy storage component may be in the hydraulic circuit. Thus, the energy can be transferred efficiently to the energy storage component predominantly using the hydraulic circuit, optionally also including one or more further components in the hydraulic circuit. The plurality of routing valves may be for selectively routing the hydraulic fluid to the energy storage component.

The energy storage component may be an accumulator (e.g. a hydraulic accumulator) configured to store hydraulic fluid. The accumulator may be in selective fluid communication with: the first hydraulic actuator via a first portion of the hydraulic circuit to receive pressurised hydraulic fluid from the first hydraulic actuator; and the hydraulic machine via a second portion of the hydraulic circuit, the first portion different to the second portion, to exchange pressurised hydraulic fluid with the hydraulic machine. Thus, the accumulator can receive hydraulic fluid pressurised directly by the first hydraulic actuator, or can receive hydraulic fluid pressurised directly by the hydraulic machine. In other words, the accumulator can be charged in either of two ways.

In some examples, the accumulator may be in selective fluid communication with the first hydraulic actuator via the first portion of the hydraulic circuit to receive pressurised hydraulic fluid from the hydraulic circuit, the pressurised hydraulic fluid being at least partially pressurised by fluid received into the hydraulic circuit from the first hydraulic actuator.

Where the accumulator is configured to receive hydraulic fluid pressurised directly by the hydraulic machine, it will be understood that hydraulic fluid pressurised directly by the first hydraulic actuator may be used to motor at least one of the groups of the one or more working chambers, to pressurise and pump hydraulic fluid from at least one other of the groups of the one or more working chambers to the accumulator.

The at least one among the plurality of energy control strategies may be selected based on a determined efficiency metric indicative of an amount of energy to be recovered using at least the one among the plurality of energy control strategies. Thus, the at least one energy control strategy can be selected based on efficiency (e.g. expected amount) of energy recovery.

In some examples, the at least one among the plurality of energy control strategies may be selected based on a comparison of at least two determined efficiency metrics, together indicative of an amount of energy to be recovered using at least two of the plurality of energy control strategies.

In some examples, the at least one among the plurality of energy control strategies may be only one among the plurality of energy control strategies. In other words, only one of the plurality of energy control strategies may be selected for transferring energy from the first hydraulic actuator.

The at least one among the plurality of energy control strategies may be a subset plurality among the plurality of energy control strategies. In other words, multiple of the plurality of energy control strategies may be selected and implemented concurrently. It will be understood that the subset plurality among the plurality of energy control strategies is fewer than the total number of the plurality of energy control strategies. In other words, less than the total number of the plurality of control strategies may be selected for implementation at any one time. For example, it may be that a first portion of the energy from the first hydraulic actuator is transferred to the low pressure reservoir in accordance with the second energy control strategy, and a second portion of the energy from the first hydraulic actuator is transferred to the energy storage component in accordance with the third energy control strategy. In this way, it will be understood that a portion of the energy can be recovered in a particularly efficient way, whilst one or more further portions of the energy can be transferred away from the hydraulic circuit in one or more less efficient ways, in accordance with other energy control strategies. If movement of the first movable component is required at a first rate, yet energy recovery by a given energy control strategy is only able to be utilised fully up to movement of the first movable component at a second rate, less fast than the first rate, then one or more further energy control strategies can be used to allow use of the given energy control strategy in combination with the one or more further energy control strategies during movement of the movable component at the first rate.

In some examples, it may be that the plurality of energy control strategies are arranged in an order of preference. In other words, one of the plurality of energy control strategies may be chosen in preference to another of the energy control strategies where implementation of either of the energy control strategies is possible. The first energy control strategy may be more preferable than the second energy control strategy. The first energy control strategy may be more preferable than the third energy control strategy. The third energy control strategy may be more preferable than the second energy control strategy.

The controller may be configured to determine (or the method may comprise determining) the order of preference between at least two of the plurality of energy control strategies. The order of preference may be determined based on an expected energy recovery of at least one of the plurality of energy control strategies. The order of preference may be determined based on an expected energy recovery of each of the plurality of energy control strategies.

The at least one operational characteristic of the hydraulic apparatus may comprise an actuator pressure metric indicative of the pressure at the first hydraulic actuator. The at least one operational characteristic of the hydraulic apparatus may comprise an energy storage pressure metric indicative of the pressure at the energy storage component.

The at least one operational characteristic of the hydraulic apparatus may comprise an availability of one or more of the plurality of working chambers of the hydraulic machine. The at least one operational characteristic of the hydraulic apparatus may comprise an availability of one or more groups of working chambers of the hydraulic machine.

For storing, in the energy storage component, energy generated from movement of the first movable component, if the actuator pressure metric and the energy storage pressure metric indicate that a pressure at the energy storage component is less than a pressure at the first hydraulic actuator by more than a threshold amount, the third energy control strategy may be selected. In the third energy control strategy, a hydraulic flow path between the first hydraulic actuator and the energy storage component may be separate to (i.e. does not include) the hydraulic machine. In other words, the hydraulic flow path goes directly between the first hydraulic actuator and the energy storage component without passing through any of the plurality of working chambers of the hydraulic machine.

A further energy control strategy may be selected for storing, in the energy storage component, energy generated from movement of the first movable component. The further energy control strategy may be selected if the actuator pressure metric and the energy storage pressure metric indicate that a pressure at the energy storage component is not less than a pressure at the first hydraulic actuator by more than a threshold amount. The further energy control strategy may comprise transferring energy from the first hydraulic actuator to the energy storage component via the hydraulic circuit and the hydraulic machine. In other words, energy can be transferred into the energy storage component by first transferring energy from the first hydraulic actuator to the hydraulic machine via the hydraulic circuit, and subsequently or concurrently transferring energy from the hydraulic machine to the energy storage component via the hydraulic circuit. Thus, even where the pressure at the energy storage component is not sufficient for energy to be transferred directly from the first hydraulic actuator to the energy storage component, energy can still nevertheless be transferred into the energy storage component from the first hydraulic actuator.

There are also further benefits to having separation in the hydraulic circuit of the energy storage component and the first hydraulic actuator, even when the pressures are, at times, comparable. By transferring the energy from the first hydraulic actuator to the energy storage component via the hydraulic circuit and the hydraulic machine, the pressure at the energy storage component (and in the portion of the hydraulic circuit fluidly connected thereto) can vary differently relative to the pressure at the first hydraulic actuator (and in the portion of the hydraulic actuator fluidly connected thereto). It may be that the pressure at the energy storage component may rise to a higher peak pressure than an upper pressure limit of the first hydraulic actuator. It also may be that the pressure at the energy storage component may fall to a lower threshold pressure than a lower operating pressure limit of the first hydraulic actuator. In this way, it will be understood that the pressure variation at the energy storage component may be greater than a pressure variation possible at the first hydraulic actuator. Where a large pressure variation is possible at the energy storage component, this is indicative of a large potential energy density to be stored in the energy storage component. Therefore, it may be that the energy storage component can be downsized compared to if the pressure variation at the energy storage component matched the pressure variation at the first hydraulic actuator.

The use of the energy storage component also enables power smoothing to be provided when transferring energy to or from the first hydraulic actuator. Thus, the prime mover can potentially be downsized when an energy storage component is included because the peak power demand which would otherwise be present can be met, at least partially, by energy supplied from the energy storage component. Furthermore, it will be understood that no external switching valves are required to control flow direction. By transforming the energy from the first hydraulic actuator to the energy storage component, efficiency of the energy transfer can be particularly high because throttling losses can be reduced or even completely eliminated by allowing energy to be transferred via the hydraulic machine.

The method may comprise determining or the controller may be configured to determine that the actuator pressure metric and the energy storage pressure metric indicate that a pressure at the energy storage component is less than a pressure at the first hydraulic actuator by more than a threshold amount.

The method may comprise determining or the controller may be configured to determine that the actuator pressure metric and the energy storage pressure metric indicate that a pressure at the energy storage component is not less than a pressure at the first hydraulic actuator by more than a threshold amount.

The hydraulic apparatus may comprise a second hydraulic actuator in the hydraulic circuit, in fluid communication with at least one of the plurality of working chambers and comprising a second movable component. The second hydraulic actuator may be (e.g. configured) to receive energy from the hydraulic circuit to move the second movable component. The plurality of energy control strategies may comprise a fourth energy control strategy comprising transferring energy from the first hydraulic actuator to the second hydraulic actuator via the hydraulic circuit and the hydraulic machine, to move the second movable component.

The hydraulic apparatus may be configured to restrict (e.g. prevent) hydraulic fluid flowing from the energy storage component towards the first hydraulic actuator via the first portion of the hydraulic circuit. Thus, energy cannot be transferred directly from the energy storage component to the first hydraulic actuator, and must instead be transformed using at least two groups of the plurality of working chambers. Each group may comprise as few as a single working chamber. In reference to the transforming function, it will be understood that to transfer energy from the energy storage component to the first hydraulic actuator (or to the second hydraulic actuator), at least one group of working chambers may be in fluid communication with the energy storage component and that the at least one group of working chambers is operated in a motoring mode. At the same time, at least one further group of working chambers may be in fluid communication with the first hydraulic actuator (or the second hydraulic actuator) and that said at least one further group comprises a plurality of working chambers each operated in a pumping mode, thus pumping hydraulic fluid towards the first hydraulic actuator (or the second hydraulic actuator). Thus, the energy stored in the energy storage component can be used to move the first movable component of the first hydraulic actuator (or the second movable component of the second hydraulic actuator).

It should be noted that transforming allows different pressures and/or flow rates to be 'transformed' to different pressures and/or flow rates. The advantage of the digital displacement hydraulic machine, with multiservice connections, is that the transforming can be carried out by that single hydraulic machine, by simultaneous pumping and motoring on two independently controllable service connections.

Due to the high efficiency of digital displacement pump motors, the transfer of energy from the first hydraulic actuator to the energy storage component via the hydraulic machine (or any energy transfer in the hydraulic circuit using transforming of energy using the hydraulic machine) is also particularly efficient, and more efficient than alternative technologies. It will further be understood that digital displacement pump motors are particularly suited to this application due to the accurate and independent control of pressure and flow that is possible.

In some examples, the energy storage component may be configured to receive energy via the rotatable shaft. The energy storage component may be a flywheel device, defined as a mechanical device which spins to store rotational energy. The energy storage component may be configured to receive energy via the prime mover. The energy storage component may be configured to receive energy via a further component in torque connection with the rotatable shaft. In some examples, the prime mover may be an electric motor capable of operating as an electric generator, and the energy storage component may be electrically connected to the prime mover, for exchanging energy with the prime mover. In other words, the energy storage component may be an electric storage component, which may be a battery.

In the third energy control strategy, the energy may be transferred from the first hydraulic actuator to the energy storage component via the hydraulic machine and the rotatable shaft. In the third energy control strategy, the energy may be transferred from the first hydraulic actuator to the energy storage component via the prime mover.

At a first time during movement of the first movable component in such a way as to meet the energy return criteria, a first subset of the plurality of working chambers of the hydraulic machine may be in fluid communication with the first hydraulic actuator, and at a second time, different to the first time, during movement of the first movable component in such a way as to meet the energy return criteria, a second subset of the plurality of working chambers, different to the first subset, may be in fluid communication with the first hydraulic actuator and a third subset of the plurality of working chambers, separate from any of the second subset, may be in fluid communication with a further component in the hydraulic circuit. The further component may be the energy storage component. The further component may be the second hydraulic actuator. Thus, the way in which the energy is transferred from the first hydraulic actuator may change during the movement, for example where the at least one operational characteristic changes.

The fourth energy control strategy may be more preferable than the third energy control strategy. The fourth energy control strategy may be more preferable than the second energy control strategy. In some examples, the first energy control strategy may be more preferable than the fourth energy control strategy. In other examples, the fourth energy control strategy may be more preferable than the first energy control strategy.

The fourth energy control strategy may be more preferable than the further energy control strategy.

The second hydraulic actuator may be one among a plurality of second hydraulic actuators in the hydraulic circuit. Each of the plurality of second hydraulic actuators may be configured to receive energy from the hydraulic circuit to move a respective second movable component of the second hydraulic actuator. It may be that at least some of the plurality of second hydraulic actuators are configured to be able to transfer energy to the energy storage component. It may be that none of the plurality of second hydraulic actuators are configured to be able to transfer energy to the energy storage component.

The first hydraulic actuator may be (e.g. configured) to receive energy from the hydraulic circuit to move the first movable component. The method may further comprise: receiving an actuator demand signal indicative of an actuator demand to move the first movable component of the first hydraulic actuator; and controlling at least one of the hydraulic machine and the plurality of routing valves to cause energy to be transferred from the energy storage component to the first hydraulic actuator to move the first movable component in accordance with the actuator demand.

The controller may be configured to: receive an actuator demand signal indicative of an actuator demand to move the first movable component of the first hydraulic actuator in such a way that the energy return criteria is not met; and control at least one of the hydraulic machine and the plurality of routing valves to cause energy to be transferred from the energy storage component to the first hydraulic actuator to move the first movable component in accordance with the actuator demand in such a way that the energy return criteria is not met.

Thus, the stored energy can be used to move the actuator. In some examples, the stored energy may be used to move a different actuator than the actuator from which the energy was recovered.

The second energy control strategy may be implemented using a non-proportional valve. The non-proportional valve used to implement the second energy control strategy may sometimes be referred to as a throttle valve. The plurality of routing valves may comprise the non-proportional valve in a fluid flow path between the first hydraulic actuator and the low-pressure reservoir. Thus, the valve controlling hydraulic fluid flow from the first hydraulic actuator to the low-pressure reservoir is simple to operate and typically reliable.

In some examples, where the subset plurality among the plurality of energy control strategies are selected and implemented, it may be that a first portion of the energy from the first hydraulic actuator, to be transferred to the low-pressure reservoir in accordance with the second energy control strategy, corresponds to a maximum amount of energy which can be transferred to the low-pressure reservoir from the first hydraulic actuator using the second energy control strategy. Thus, the valve controlling fluid flow from the first hydraulic actuator to the low-pressure reservoir can be a simple valve, such as a non-proportional valve. Accordingly, reliability of the hydraulic apparatus can be relatively high, and production costs of the hydraulic apparatus can be relatively low. In such an arrangement, the remaining portion of the energy to be transferred from the first hydraulic actuator can be achieved through one or more other of the plurality of energy control strategies.

Where a received actuator demand signal is indicative of an actuator demand to move the first movable component of the first hydraulic actuator in such a way that the energy return criteria is met, the controller may be further configured to determine whether the actuator demand signal is indicative of an actuator demand to move the first movable component with a speed greater than a first speed threshold. The first speed threshold may correspond to a maximum speed of movement of the first movable component which can be realised by one or more of the energy control strategies, not including the second energy control strategy. In response to a determination that the demanded movement is at a first speed less than the first speed threshold, the controller may be configured to control the hydraulic machine to implement the one or more energy control strategies not including the second energy control strategy to transfer energy from the first hydraulic actuator at a first rate. In response to a determination that the demanded movement is at a second speed greater than the first speed threshold, the controller may be configured to control the hydraulic machine to implement the second energy control strategy in combination with one or more other energy control strategies. Specifically, the controller may be configured to control the hydraulic machine to transfer energy from the first hydraulic actuator via the second energy control strategy at a second rate, and to transfer energy from the first hydraulic actuator via one or more other energy control strategies at a third rate. Thus, energy is transferred from the first hydraulic actuator by a plurality of different energy control strategies, at an energy transfer rate being a sum of the second rate and the third rate. When the demanded speed of movement of the first hydraulic actuator increases from a first speed less than the first speed threshold to a second speed greater than the first speed threshold, it may be that the third rate of energy transfer is less than the first rate of energy transfer. In other words, as soon as energy needs to be transferred via the second energy control strategy, it may be that a maximum rate of energy transfer via the second energy control strategy is implemented. Accordingly, the valve used to implement the second energy control strategy can be a simple non-proportional valve, ensuring complexity and cost for the apparatus is simpler and lower than were a proportionally controllable valve to be used. It will be understood that an energy transfer rate for other energy control strategies, for example using the hydraulic machine, can typically be more finely controlled than for the second energy control strategy.

In one particular example, it may be that when the demanded speed of movement of the first hydraulic actuator increases from a first speed less than the first speed threshold to a second speed greater than the first speed threshold, the flow rate of hydraulic fluid flowing through the hydraulic machine is decreased by an amount corresponding to the flow rate which can be handled by the second energy control strategy, and the second energy control strategy is implemented (to transfer hydraulic fluid from the first hydraulic actuator at the flow rate which can be handled by the second energy control strategy) in conjunction with one or more other energy control strategies, for which hydraulic fluid flows through the hydraulic machine. Thus, the speed of movement of the first hydraulic actuator can still be varied smoothly around the first speed threshold, even where the use of the second energy control strategy is changed from being off to being fully on.

It will be understood that the flow rate which can be handled by the second energy control strategy may vary depending on local parameters of the hydraulic apparatus, such as the pressure drop between the first hydraulic actuator and the low-pressure reservoir. The expected flow rate from the first hydraulic actuator via the second energy control strategy may be determined based on a lookup table. Similarly, command signals for achieving the required corresponding decrease in flow rate through the hydraulic machine may be determined based on a displacement fraction lookup table. It may be that the controller is configured to delay switching between different combinations of energy control strategies in response to changes in the demanded speed of the first hydraulic actuator, so as to reduce or even completely prevent rapid switching between different energy control strategies, including rapid operation of valves.

It may be that the controller is configured to delay a control signal to cause the change in the flow rate of hydraulic fluid through the hydraulic machine relative to a control signal to cause the plurality of routing valves to implement the second energy control strategy. Thus, where the hydraulic machine is capable of implementing a change in flow rate more quickly than a valve controlling fluid flow to the low-pressure reservoir would be fully-open, the change in the hydraulic machine can be delayed so that the change in flow rates is implemented at a more closely-aligned time, such as at substantially the same instant.

Viewed from another aspect, there is provided a hydraulic apparatus as described herein, further comprising the controller as described herein.

The hydraulic apparatus may be a vehicle. The vehicle may be a motorised vehicle. The vehicle may be a telehandler. The vehicle may be a wheel loader. The vehicle may be a forest harvester. The vehicle may be a forklift truck.

It will be understood that a hydraulic actuator is substantially any hydraulic component for exchanging energy between pressurised hydraulic fluid and kinetic movement. In other words, the hydraulic actuator may extract energy from pressurised hydraulic fluid by causing movement of a movable component by force exerted on the movable component by the pressurised hydraulic fluid. The hydraulic actuator may additionally or alternatively extract energy from movement of a movable component by causing pressurisation of hydraulic fluid by force exerted by the movable component.

The kinetic movement may be linear. The kinetic movement may be rotary. In some examples, at least one of the first hydraulic actuator and the second hydraulic actuator may be a hydraulic propulsion motor.

The prime mover may be a combustion engine. The prime mover may be fuelled by diesel. The prime mover may be fuelled by petrol. The prime mover may be an electric motor.

It will be understood that the plurality of routing valves are substantially any valves in the hydraulic circuit which can affect a fluid flow characteristic of the hydraulic circuit, such as a pressure, a flow rate, or a route of the hydraulic fluid through the hydraulic circuit. It will be understood that controlling at least one of the plurality of routing valves will still be understood to be controlling the plurality of routing valves. In some examples, it may be that each of the plurality of routing valves can be controlled to implement the selected at least one energy control strategy.

The plurality of routing valves may comprise a regeneration valve provided to controllably restrict fluid communication between the energy storage component and the first hydraulic actuator. The regeneration valve may be a proportional flow valve. It will be understood that a proportional flow valve is controllable in a first configuration to partially restrict fluid flow therethrough, in a second configuration to partially restrict fluid flow therethrough to a different amount than in the first configuration, and in a third configuration to substantially prevent fluid flow therethrough.

The plurality of routing valves may comprise a plurality of valves to bring the plurality of working chambers into fluid communication with the first hydraulic actuator and the second hydraulic actuator, and optionally with the energy storage component. In some examples, the plurality of working chambers may be grouped into a plurality of sub-groups, each comprising a plurality of working chambers and to be controllably routed independently of at least one other of the plurality of sub-groups. In this way, it is possible to fluidly connect one of the plurality of sub-groups of working chambers to the first hydraulic actuator, whilst another of the plurality of sub-groups is fluidly connected to the second hydraulic actuator and a further one of the plurality of sub-groups is fluidly connected to a further hydraulic component in the hydraulic circuit (such as the energy storage component).

It will be understood that the hydraulic apparatus may include a pre-charging component to ensure that the hydraulic fluid pressure in the hydraulic circuit can be maintained above a minimum hydraulic fluid pressure to ensure operation of the hydraulic apparatus (particularly the hydraulic machine) can be initialised and maintained. The pre-charging component may be driven by torque supplied from the prime mover, for example via the rotatable shaft. The precharge portion comprises a hydraulic accumulator which serves to maintain a minimum charge pressure acting on the low pressure side of the hydraulic circuit.

It will be understood that where elements of the hydraulic apparatus are described as being in the hydraulic circuit, such elements are in at least selective fluid communication with one or more other elements of the hydraulic apparatus via the hydraulic circuit.

DESCRIPTION OF THE DRAWINGS

An example embodiment of the present invention will now be illustrated with reference to the following Figures in which:

FIGS. 4 and 5 show additional steps for the method of FIG. 3, according to an example of the present disclosure.

DETAILED DESCRIPTION OF AN EXAMPLE EMBODIMENT

Figure 1:
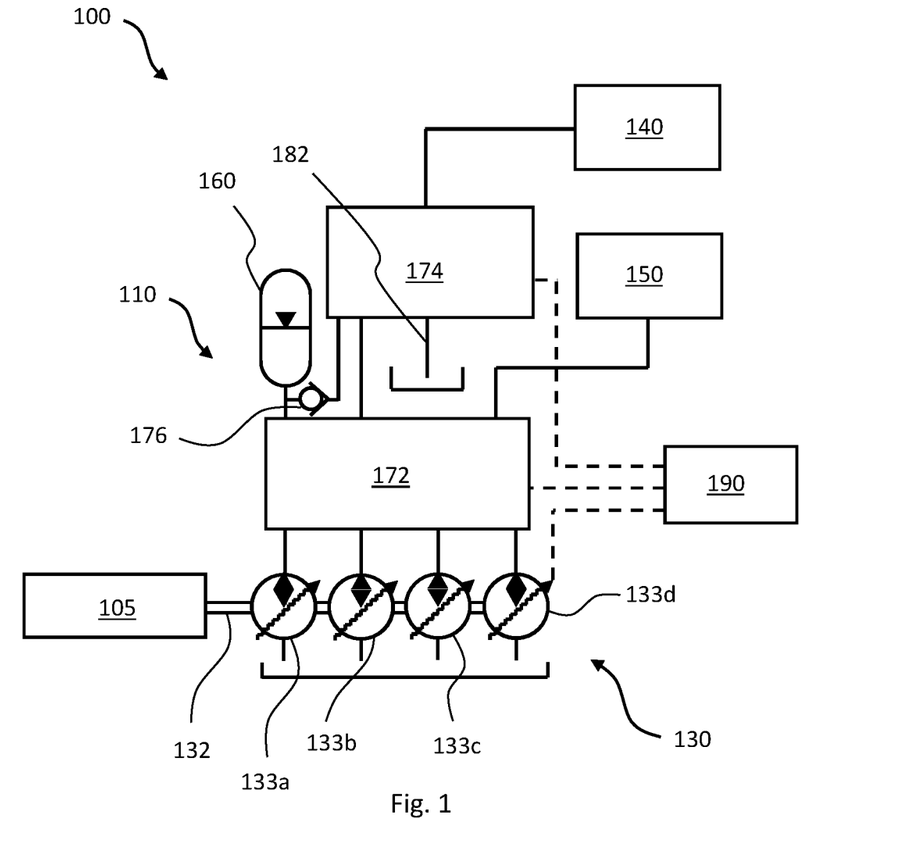
FIG. 1 is a schematic illustration of hydraulic apparatus according to an example of the present disclosure.

FIG. 1 is a schematic illustration of hydraulic apparatus according to an example of the present disclosure. The hydraulic apparatus 100 is for use in a vehicle and can be used to provide energy to one or more tools or other work functions of the vehicle, each to be powered hydraulically. The hydraulic apparatus 100 comprises or is mechanically connected to a prime mover 105 arranged to exert torque. The prime mover 105 is typically a motor, such as a combustion engine, arranged to convert energy from a fuel source to rotational torque. The hydraulic apparatus 100 further comprises a hydraulic circuit 110 through which hydraulic fluid can flow. The hydraulic circuit 110 is typically formed from a plurality of fluid flow conduits, such as pipework, providing a plurality of possible routes through which hydraulic fluid can flow.

The hydraulic apparatus 100 can further comprise a precharge portion (not shown in FIG. 1) for ensuring the pressure in the hydraulic circuit 110 remains above a minimum operating pressure of the hydraulic circuit 110.

The hydraulic apparatus 100 further comprises a hydraulic machine 130, in the form of a digital displacement pump-motor 130. The hydraulic machine 130 comprises a rotatable shaft 132 arranged to be driven by the prime mover 105. In other words, the rotatable shaft 132 of the hydraulic machine has torque applied thereto by operation of the prime mover 105. The hydraulic machine 130 comprises a plurality of pump modules 133a, 133b, 133c, 133d, in this example four pump modules 133a, 133b, 133c, 133d. Each module is arranged to be independently controlled to, in a first operating mode, more commonly referred to as a pumping mode, transfer energy from the rotatable shaft 132 of the hydraulic machine 130 into the hydraulic circuit 110 by pumping hydraulic fluid into the hydraulic circuit 110. Or, each module may be controlled to, in a second operating mode more commonly referred to as a motoring mode, transfer energy from the hydraulic circuit 110 to the rotatable shaft 132 of the hydraulic machine 130 by causing hydraulic fluid from the hydraulic circuit 110 to apply torque to the rotatable shaft via the respective pump module 133a, 133b, 133c, 133d. Each pump module 133a, 133b, 133c, 133d defines at least one, and typically a plurality of working chambers in the hydraulic circuit which are fluidly connected to the same high-pressure manifold and which are controlled together. Each working chamber is defined partially by a movable working surface mechanically coupled to the rotatable shaft, such that movement of the working surface and the rotatable shaft causes exchange of energy between the rotatable shaft and the hydraulic circuit. The pump modules 133a, 133b, 133c, 133d are described further with reference to FIG. 5 hereinafter.

The hydraulic apparatus 100 further comprises a first hydraulic actuator 140, in the form of a vertical movement actuator 140, such as a lifting ram 140, in the hydraulic circuit 110. The first hydraulic actuator 140 defines a working chamber. The working chamber is partially defined by a movable component (not shown in FIG. 1) of the first hydraulic actuator 140, which is movable to expand or contract the working chamber to increase or reduce the volume thereof. The movable component of the first hydraulic actuator 140 is mechanically connected to a further movable component of the vehicle, such as a lifting arm (not shown in FIG. 1). The first hydraulic actuator 140 will exchange energy with the hydraulic circuit 110 by movement of the movable component. A force on the first hydraulic actuator 140 caused by the weight of the components of the first hydraulic actuator 140 acting on the movable component as well as any external load to be carried by the lift arm, may act to cause downward movement of the movable component. In this way, potential energy from the external load and the weight of the components is transferred into the hydraulic circuit 110 due to pressurisation of the hydraulic fluid. The pressurisation of the hydraulic fluid can be used to do further work by another component in the hydraulic circuit 110, for example, driving rotation of the rotatable shaft 132 of the hydraulic machine 130, as will be described further hereinafter. Conversely, if the pressurisation of the hydraulic fluid is sufficient to overcome the force on the movable component of the first hydraulic actuator 140, the external load carried by the lifting arm can be raised, and the first hydraulic actuator 140 can be considered to be consuming energy from the hydraulic circuit 110. In some examples, the hydraulic apparatus may comprise a plurality of first actuators 140, each able to transfer energy into the hydraulic circuit 110 during energy recovery. The first actuator 140 may sometimes be referred to as a regeneration actuator 140.

The hydraulic apparatus 100 further comprises one or more second hydraulic actuators 150, similar to the first hydraulic actuator 140, but typically not arranged to transfer energy into the hydraulic circuit 110.

Typically, it will be understood that the exchange of energy between the hydraulic circuit 110 and the further hydraulic components, such as the first hydraulic actuator and the one or more second hydraulic actuators 150, is by flow of pressurised hydraulic fluid in the hydraulic circuit 110.

The hydraulic apparatus 100 further comprises an energy storage component 160 in the form of a hydraulic accumulator 160 arranged to store hydraulic fluid therein at a pressure exceeding atmospheric pressure, for example 300 bar ($3 \times 10^7$ pascal). The energy storage component 160 can be brought into fluid communication with the first hydraulic actuator 140. The energy storage component 160 can separately be brought into fluid communication with the hydraulic machine 130. In this example, it is not possible to bring the energy storage component 160 into direct fluid communication with the one or more second hydraulic actuators 150.

The hydraulic apparatus 100 further comprises a plurality of valves in the form of a plurality of routing valves 172, 174, 176. The routing valves 172, 174, 176 are together for selectively routing the hydraulic fluid between the pump modules 133a, 133b, 133c, 133d of the hydraulic machine 130, the first hydraulic actuator 140, the one or more second hydraulic actuators 150 and the energy storage component 160. In particular, the plurality of routing valves includes a plurality of bus valves 172 to independently control hydraulic fluid routing between each of the plurality of pump modules 133a, 133b, 133c, 133d and any one of: the first hydraulic actuator 140; at least one of the one or more second hydraulic actuators 150; and the energy storage component 160. In this way, any one or more (or even all) of the plurality of pump modules 133a, 133b, 133c, 133d can be brought into fluid communication with any combination of the first hydraulic actuator 140, one or more of the second hydraulic actuators 150 and the energy storage component 160.

The plurality of routing valves also includes a first actuator control valve 174 provided in a fluid communication pathway between the first hydraulic actuator 140, the energy storage component 160, and the hydraulic machine 130 via the plurality of bus valves 172. The first actuator control valve 174 in this example further includes a low-pressure manifold output 182, for example at atmospheric pressure. In a first operating mode, the first actuator control valve 174 can be configured to allow hydraulic fluid to flow from the hydraulic machine 130 via the plurality of bus valves 172, to the first hydraulic actuator 140 to exchange energy from the hydraulic machine 130 to the first hydraulic actuator 140. In a second operating mode, the first actuator control valve 174 can be configured to allow hydraulic fluid to flow from the first hydraulic actuator 140 to the hydraulic machine 130 via the plurality of bus valves 172. In a third operating mode, the first actuator control valve 174 can be configured to allow hydraulic fluid to flow from the first hydraulic actuator 140 to the energy storage component 160 without passing via the hydraulic machine 130. In a fourth operating mode, the first actuator control valve 174 can be configured to allow hydraulic fluid to flow from the first hydraulic actuator 140 to the low-pressure manifold output 182. In this way, it will be understood that energy from the first hydraulic actuator 140 can be recovered to one of a plurality of different possible hydraulic components in the hydraulic circuit 110.

The plurality of routing valves further includes a flow restriction valve 176 to restrict (e.g. to prevent) hydraulic fluid flow from the energy storage component 160 to the first actuator control valve 174, and therefore to the first hydraulic actuator 140.

The hydraulic apparatus 100 further comprises a controller 190 for controlling operation of the hydraulic apparatus 100. The controller 190 is described further with reference to FIG. 2 hereinafter.

Figure 2:
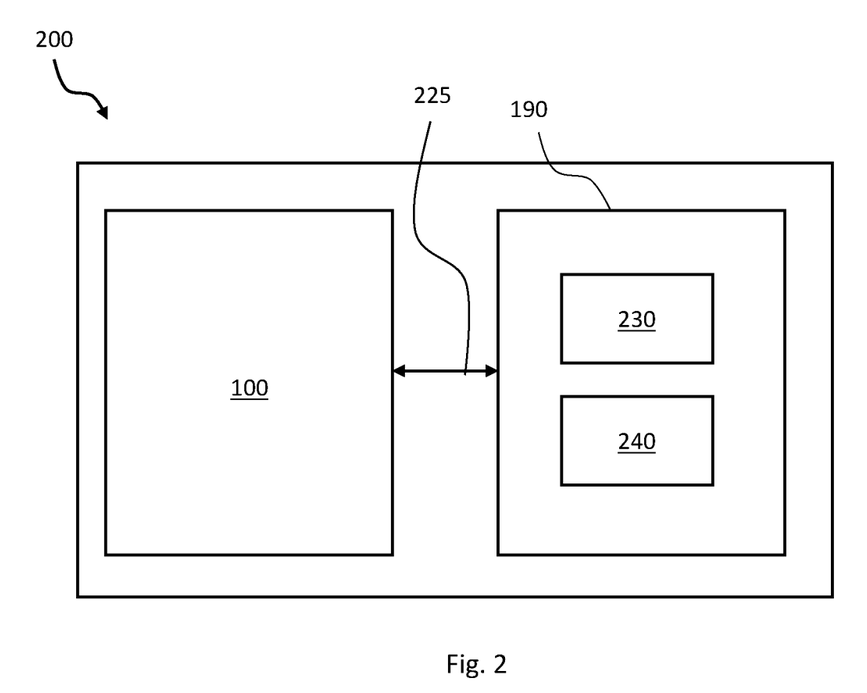
FIG. 2 is a schematic illustration of systems of a vehicle according to an example of the present disclosure.

FIG. 2 is a schematic illustration of systems of a vehicle according to an example of the present disclosure. The vehicle 200 comprises the hydraulic apparatus 100 as described with reference to FIG. 1 hereinbefore including the controller 190. The controller 190 is configured to exchange signals 225 with the hydraulic apparatus 100 to control the hydraulic apparatus 100 in accordance with input signals received by the controller 190, for example from user inputs by an operator of the vehicle 200. The controller 190 in this example is realised by one or more processors 230 and a computer-readable non-transitory solid-state memory 240. The memory 240 stores instructions which, when executed by the one or more processors 230, cause the hydraulic apparatus 100 to operate as described herein.

Although the controller 190 is shown as being part of the vehicle 200, it will be understood that one or more components of the controller 190, or even the whole controller 190, can be provided separate from the vehicle 200, for example remotely from the vehicle 200, to exchange signals with the vehicle 200 by wireless communication. In examples, at least some of the components of the controller 190 can be distributed at different parts of the vehicle 200. Thus, the controller 190 can comprise two or more processors, distributed at different parts of the vehicle 200.

Figure 3:
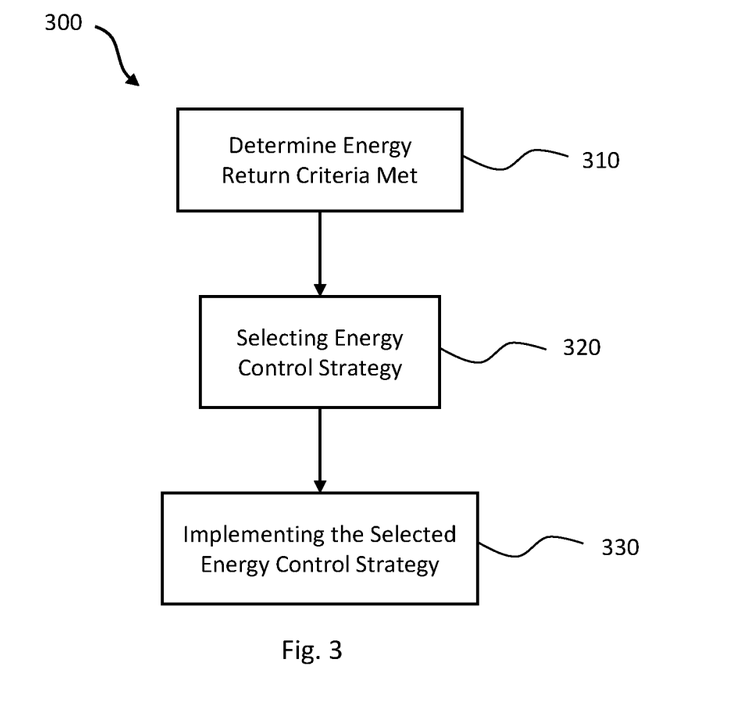
FIG. 3 shows a method according to an example of the present disclosure.

FIG. 3 shows a method according to an example of the present disclosure. The method 300 is a method of controlling the hydraulic apparatus 100 described hereinbefore with reference to FIG. 1. The method 300 can be implemented by the controller 190 described with reference to FIG. 2 hereinbefore.

The method comprises determining 310 that an energy return criteria has been met. The energy return criteria is indicative of movement of the first movable component in such a way as to cause energy to be transferred from the first hydraulic actuator into the hydraulic circuit.

In response to determining 310 that the energy return criteria has been met, the method 300 comprises selecting 320 an energy control strategy. Specifically, the method 300 comprises selecting 320 at least one among a plurality of energy control strategies to transfer the energy from the first hydraulic actuator. Typically, the energy control strategies determine how to transfer the energy, that has been transferred from the first hydraulic actuator to the hydraulic circuit, away from the hydraulic circuit. The at least one energy control strategy is selected based on at least one operational characteristic of the hydraulic apparatus. The operational characteristic may be indicative of a pressure or flow rate at one or more hydraulic components of in the hydraulic circuit. In some examples, the operational characteristic may be indicative of a number of groups of working chambers of the hydraulic machine which are required to meet existing load demands of the hydraulic machine.

The plurality of energy control strategies includes a first energy control strategy and a second energy control strategy.

The first energy control strategy is to transfer energy from the first hydraulic actuator to an energy consumer via the hydraulic circuit. The energy consumer is in torque connection with the hydraulic machine. The energy consumer is typically in torque connection with the rotatable shaft of the hydraulic machine. This includes for example an energy consumer in torque connection with the prime mover crankshaft, which is in torque connection with the prime mover main shaft.

The second energy control strategy is to transfer energy from the first hydraulic actuator to a low-pressure manifold output (e.g. to a low-pressure reservoir) of hydraulic fluid in the hydraulic circuit. In this way, energy can be lost from the hydraulic circuit substantially without recovering the energy. It will be understood that the second energy control strategy can be considered to be an energy control strategy of last resort, to be used when no more efficient energy control strategies are available to use.

In some examples, second energy control strategies can be provided, such as to transfer energy from the first hydraulic actuator to the energy storage component via the hydraulic circuit and the hydraulic machine.

The plurality of energy control strategies also typically includes a third energy control strategy to transfer energy from the first hydraulic actuator to the energy storage component via the hydraulic circuit. In a specific example, the hydraulic flow path to be used for the energy transfer of the third energy control strategy is separate from (e.g. does not pass through) the hydraulic machine. In other words, energy is directly transferred from the first hydraulic actuator to the energy storage component without doing work using any of the pump modules of the hydraulic machine.

The plurality of energy control strategies includes a fourth energy control strategy to transfer energy from the first hydraulic actuator to the second hydraulic actuator via the hydraulic circuit and the hydraulic machine. In other words, energy is transferred from the first hydraulic actuator to the second hydraulic actuator by exchanging energy from the first hydraulic actuator to the hydraulic machine and subsequently or concurrently exchanging energy from the hydraulic machine to the second hydraulic actuator.

In response to selecting 320 the at least one energy control strategy, the method 300 further comprises implementing 330 the selected at least one energy control strategy. Specifically, the method 300 comprises controlling at least one of the hydraulic machine and the plurality of routing valves to implement 330 the selected at least one energy control strategy during movement of the first movable component of the first hydraulic actuator. The movement of the first movable component is in such a way as to meet the energy return criteria.

Figure 4:
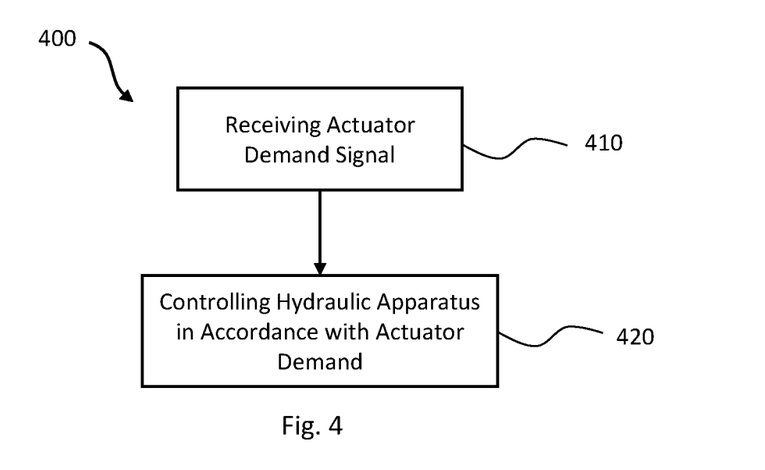

FIG. 4 show additional steps for the method of FIG. 3, according to an example of the present disclosure. The method 400 shown in FIG. 4 is to be performed where energy has been transferred from the first hydraulic actuator to the energy storage component, such as in accordance with the third energy control strategy.

The method 400 comprises receiving 410 an actuator demand signal. The further demand signal is indicative of an actuator demand to move the first movable component of the first hydraulic actuator in such a way that the energy return criteria is not met. In some examples, the actuator demand signal may instead be indicative of an actuator demand to operate the second hydraulic actuator.

In response to receiving 410 the actuator demand signal, the method 400 comprises controlling 420 the hydraulic apparatus in accordance with the actuator demand. Specifically, the method 400 comprises controlling 420 at least one of the hydraulic machine and the plurality of routing valves to cause energy to be transferred from the energy storage component to the first hydraulic actuator to move the movable component in accordance with the actuator demand. Alternatively, the method 400 comprises controlling 420 at least one of the hydraulic machine and the plurality of routing valves to cause energy to be transferred from the energy storage component to the second hydraulic actuator to operate the second hydraulic actuator in accordance with the actuator demand.

Figure 5:
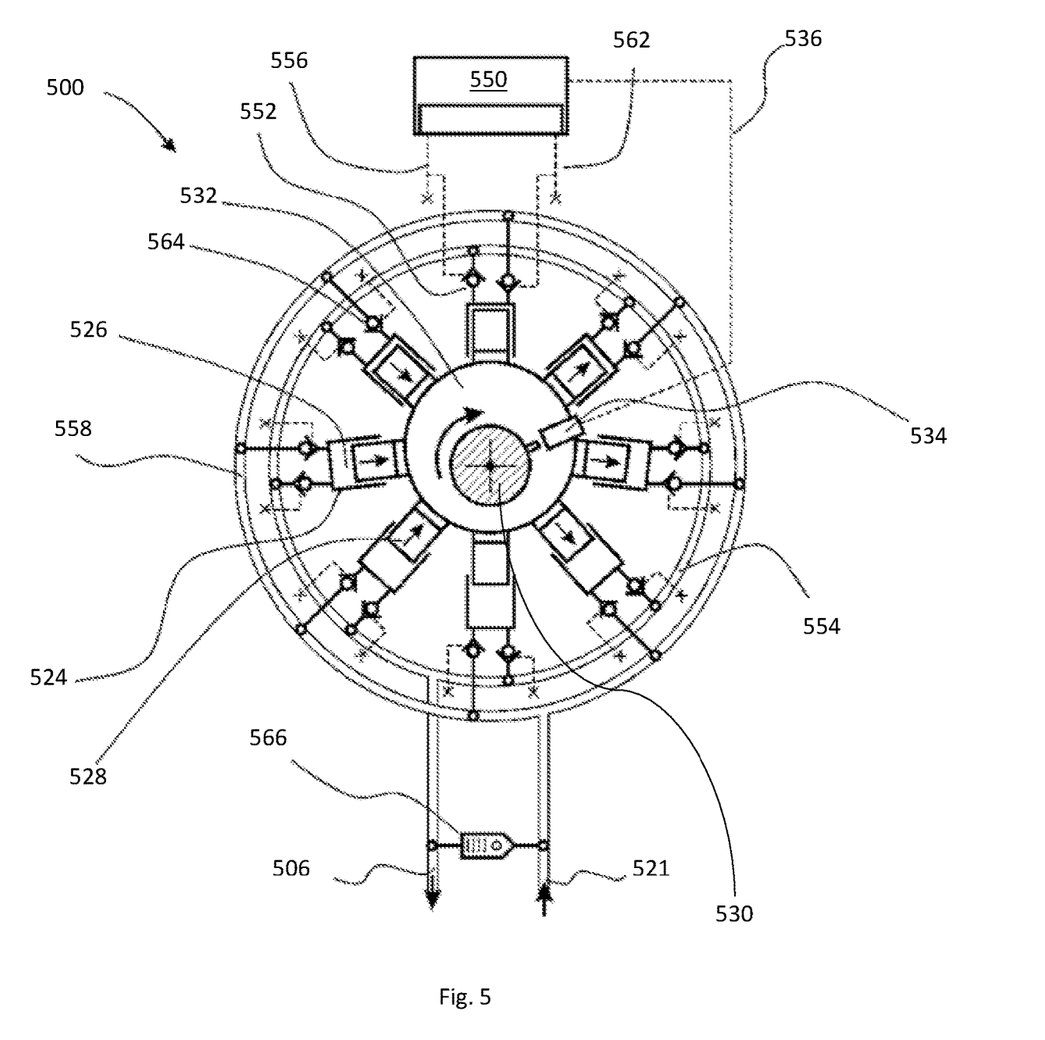
FIG. 5 is a schematic diagram of an electronically commutated hydraulic machine.

FIG. 5 is a schematic diagram of part of the hydraulic apparatus shown in FIG. 1, and shows a single group of working chambers currently connected to one or more hydraulic components (e.g. an actuator) through a high pressure manifold 554. FIG. 5 provides detail on the first group 500, said group comprises a plurality of working chambers (8 are shown) having cylinders 524 which have working volumes 526 defined by the interior surfaces of the cylinders and pistons 528 (providing working surfaces 528) which are driven from a rotatable shaft 530 by an eccentric cam 532 and which reciprocate within the cylinders to cyclically vary the working volume of the cylinders. The rotatable shaft is firmly connected to and rotates with a drive shaft. A shaft position and speed sensor 534 determines the instantaneous angular position and speed of rotation of the shaft, and through a signal line 536 informs a controller 550, which enables the controller 550 to determine the instantaneous phase of the cycles of each cylinder.

The working chambers are each associated with Low Pressure Valves (LPVs) in the form of electronically actuated face-sealing poppet valves 552, which have an associated working chamber and are operable to selectively seal off a channel extending from the working chamber to a low-pressure hydraulic fluid manifold 554, which may connect one or several working chambers, or indeed all as is shown here, to the low-pressure hydraulic fluid manifold hydraulic circuit. The LPVs are normally open solenoid actuated valves which open passively when the pressure within the working chamber is less than or equal to the pressure within the low-pressure hydraulic fluid manifold, i.e. during an intake stroke, to bring the working chamber into fluid communication with the low-pressure hydraulic fluid manifold but are selectively closable under the active control of the controller via LPV control lines 556 to bring the working chamber out of fluid communication with the low-pressure hydraulic fluid manifold. The valves may alternatively be normally closed valves.

The working chambers are each further associated with a respective High-Pressure Valve (HPV) 564 each in the form of a pressure actuated delivery valve. The HPVs open outwards from their respective working chambers and are each operable to seal off a respective channel extending from the working chamber through a valve block to a high-pressure hydraulic fluid manifold 558, which may connect one or several working chambers, or indeed all as is shown in FIG. 5. The HPVs function as normally-closed pressure-opening check valves which open passively when the pressure within the working chamber exceeds the pressure within the high-pressure hydraulic fluid manifold. The HPVs also function as normally-closed solenoid actuated check valves which the controller may selectively hold open via HPV control lines 562 once that HPV is opened by pressure within the associated working chamber. Typically, the HPV is not openable by the controller against pressure in the high-pressure hydraulic fluid manifold. The HPV may additionally be openable under the control of the controller when there is pressure in the high-pressure hydraulic fluid manifold but not in the working chamber, or may be partially openable.

In a pumping mode, the controller selects the net rate of displacement of hydraulic fluid from the working chamber to the high-pressure hydraulic fluid manifold by the hydraulic motor by actively closing one or more of the LPVs typically near the point of maximum volume in the associated working chamber's cycle, closing the path to the low-pressure hydraulic fluid manifold and thereby directing hydraulic fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement.

In a motoring mode of operation, the controller selects the net rate of displacement of hydraulic fluid, displaced via the high-pressure hydraulic fluid manifold, actively closing one or more of the LPVs shortly before the point of minimum volume in the associated working chamber's cycle, closing the path to the low-pressure hydraulic fluid manifold which causes the hydraulic fluid in the working chamber to be compressed by the remainder of the contraction stroke. The associated HPV opens when the pressure across it equalises and a small amount of hydraulic fluid is directed out through the associated HPV, which is held open by the controller. The controller then actively holds open the associated HPV, typically until near the maximum volume in the associated working chamber's cycle, admitting hydraulic fluid from the high-pressure hydraulic fluid manifold to the working chamber and applying a torque to the rotatable shaft.

As well as determining whether or not to close or hold open the LPVs on a cycle by cycle basis, the controller is operable to vary the precise phasing of the closure of the HPVs with respect to the varying working chamber volume and thereby to select the net rate of displacement of hydraulic fluid from the high-pressure to the low-pressure hydraulic fluid manifold or vice versa.

Arrows on the low pressure fluid connection 506, and the high-pressure fluid connection 521 indicate hydraulic fluid flow in the motoring mode; in the pumping mode the flow is reversed. A pressure relief valve 566 may protect the first group from damage.

In normal operation, the active and inactive cycles of working chamber volume are interspersed to meet the demand indicated by the received demand signal.

In summary, there is provided a controller for hydraulic apparatus (100). The controller is configured to determine (310) that an energy return criteria has been met by movement of a first movement component of a first hydraulic actuator. In response thereto, the controller is further configured to select (320) at least one among a plurality of energy control strategies based on at least one operational characteristic of the hydraulic apparatus, and to control (330) the hydraulic apparatus to implement the energy control strategy during movement of the first movable component in such a way as to meet the energy return criteria. The plurality of energy control strategies comprises a first energy control strategy and a second energy control strategy. The first energy control strategy comprises transferring energy from the first hydraulic actuator, via a hydraulic machine, to an energy consumer in torque connection with the hydraulic machine. The second energy control strategy comprises transferring energy from the first hydraulic actuator to a low-pressure reservoir of hydraulic fluid in the hydraulic circuit.

Throughout the description and claims of this specification, the words "comprise" and "contain" and variations of them mean "including but not limited to", and they are not intended to and do not exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A controller for a hydraulic apparatus, the hydraulic apparatus comprising:
a prime mover;
a hydraulic circuit through which hydraulic fluid can flow;
a hydraulic machine having a rotatable shaft in driven engagement with the prime mover and the hydraulic machine defining a plurality of working chambers in the hydraulic circuit, each working chamber being defined partially by a movable working surface mechanically coupled to the rotatable shaft, such that, in operation, the hydraulic machine exchanges energy with the hydraulic circuit and the prime mover by movement of the working surfaces and the rotatable shaft;
a first hydraulic actuator in the hydraulic circuit, in fluid communication with at least one of the plurality of working chambers and comprising a first movable component, such that movement of the first movable component causes the first hydraulic actuator to transfer energy to the hydraulic circuit; and
a plurality of routing valves in the hydraulic circuit for selectively routing the hydraulic fluid between one or more of: at least one of the plurality of working chambers; and the first hydraulic actuator, the controller configured to:
determine that an energy return criteria has been met by the first hydraulic actuator and, in response thereto, select at least one among a plurality of energy control strategies to transfer the energy from the first hydraulic actuator via the hydraulic circuit based on at least one operational characteristic of the hydraulic apparatus; and
control at least one of the hydraulic machine and the plurality of routing valves to implement the at least one selected energy control strategy during movement of the first
movable component, the movement of the first movable component in such a way as to meet the energy return criteria,
wherein the plurality of energy control strategies comprises a first energy control strategy and a second energy control strategy,
wherein the first energy control strategy comprises transferring energy from the first hydraulic actuator, via the hydraulic machine, to an energy consumer in torque connection with the hydraulic machine,
wherein the second energy control strategy comprises transferring energy from the first hydraulic actuator to a low-pressure reservoir of hydraulic fluid in the hydraulic circuit, and
wherein the at least one operational characteristic of the hydraulic apparatus comprises an indication of an expected energy recovery of one or more of the energy control strategies,
wherein at a first time during movement of the first movable component in such a way as to meet the energy return criteria, a first subset of the plurality of working chambers of the hydraulic machine is in fluid communication with the first hydraulic actuator, and at a second time, different to the first time, during movement of the first movable component in such a way as to meet the energy return criteria, a second subset of the plurality of working chambers, different to the first subset, is in fluid communication with the first hydraulic actuator and a third subset of the plurality of working chambers, separate from any of the second subset, is in fluid communication with a further component in the hydraulic circuit.

2. The controller as claimed in claim 1, wherein the indication of the expected energy recovery is of at least the selected energy control strategy.

3. The controller as claimed in claim 1, wherein the controller is configured to: determine the indication of the expected energy recovery.

4. The controller as claimed in claim 3, wherein the indication of the expected energy recovery is determined subsequent to determining that the energy return criteria has been met.

5. The controller as claimed in claim 1, wherein the indication of the expected energy recovery is the efficiency of the one or more of the energy control strategies.

6. The controller as claimed in claim 1, wherein the energy consumer in torque connection with the hydraulic machine, is the prime mover.

7. The controller as claimed in claim 1, wherein the hydraulic apparatus comprises an energy storage component, and wherein the plurality of energy control strategies comprises a third energy control strategy comprising transferring energy from the first hydraulic actuator to the energy storage component via the hydraulic circuit.

8. The controller as claimed in claim 7, wherein the energy storage component is in the hydraulic circuit.

9. The controller as claimed in claim 8, wherein the energy storage component is an accumulator configured to store hydraulic fluid, and wherein the accumulator is in selective fluid communication with:
the first hydraulic actuator via a first portion of the hydraulic circuit to exchange pressurised hydraulic fluid with the first hydraulic actuator; and
the hydraulic machine via a second portion of the hydraulic circuit, the first portion different to the second portion, to exchange pressurised hydraulic fluid with the hydraulic machine.

10. The controller as claimed in claim 9, wherein the hydraulic apparatus is configured to restrict hydraulic fluid flowing from the energy storage component towards the first hydraulic actuator via the first portion of the hydraulic circuit.

11. The controller as claimed in claim 8, wherein the at least one operational characteristic of the hydraulic apparatus comprises an actuator pressure metric indicative of the pressure at the first hydraulic actuator, and an energy storage pressure metric indicative of the pressure at the energy storage component.

12. The controller as claimed in claim 11, wherein, for storing in the energy storage component energy generated from movement of the first movable component, when the actuator pressure metric and the energy storage pressure metric indicate that a pressure at the energy storage component is not less than a pressure at the first hydraulic actuator by more than a threshold amount, a further energy control strategy, among the plurality of energy control strategies, is selected, the further energy control strategy comprising transferring energy from the first hydraulic actuator to the energy storage component via the hydraulic circuit and the hydraulic machine.

13. The controller as claimed in claim 7, wherein the energy storage component is for receiving energy via the rotatable shaft, and wherein in the third energy control strategy, the energy is transferred from the first hydraulic actuator to the energy storage component via the hydraulic machine and the rotatable shaft.

14. The controller as claimed in claim 7, wherein the hydraulic apparatus comprises a second hydraulic actuator in the hydraulic circuit, in fluid communication with at least one of the plurality of working chambers and comprising a second movable component, such that, in operation, the second hydraulic actuator receives energy from the hydraulic circuit to move the second movable component, and wherein the plurality of energy control strategies comprises a fourth energy control strategy comprising transferring energy from the first hydraulic actuator to the second hydraulic actuator via the hydraulic circuit and the hydraulic machine, to move the second movable component.

15. The controller as claimed in claim 7, wherein, in operation, the first hydraulic actuator receives energy from the hydraulic circuit to move the first movable component and wherein the controller is configured to:
receive an actuator demand signal indicative of an actuator demand to move the first movable component of the first hydraulic actuator; and
control at least one of the hydraulic machine and the plurality of routing valves to cause energy to be transferred from the energy storage component to the first hydraulic actuator to move the first movable component in accordance with the actuator demand.

16. The controller as claimed in claim 1, wherein the controller is configured to:
receive an actuator demand signal indicative of an actuator demand to move the first movable component of the first hydraulic actuator in such a way that the energy return criteria is met;
determine that the actuator demand signal is indicative of an actuator demand to move the first movable component with a speed greater than a first speed threshold, the first speed threshold corresponding to a maximum speed of movement of the first movable component which can be realised by one or more of the energy control strategies, not including the second energy control strategy; and
in response to said determination, control the hydraulic machine and the plurality of routing valves to cause energy to be transferred from the first hydraulic actuator using the second energy control strategy, at a first rate, corresponding to a maximum energy transfer rate supported by the second energy control strategy, and to cause energy to be transferred from the first hydraulic actuator using one or more further energy control strategies, not including the second energy control strategy, at a second rate, the first rate and the second rate corresponding to a rate of energy transfer required for the first movable component of the first hydraulic actuator to move at the demanded speed.

17. A hydraulic apparatus comprising:
a prime mover;
a hydraulic circuit through which hydraulic fluid can flow;
a hydraulic machine having a rotatable shaft in driven engagement with the prime mover and the hydraulic machine defining a plurality of working chambers in the hydraulic circuit, each working chamber being defined partially by a movable working surface mechanically coupled to the rotatable shaft, such that, in operation, the hydraulic machine exchanges energy with the hydraulic circuit and the prime mover by movement of the working surfaces and the rotatable shaft;
a first hydraulic actuator in the hydraulic circuit, in fluid communication with at least one of the plurality of working chambers and comprising a first movable component, such that movement of the first movable component causes the first hydraulic actuator to transfer energy to the hydraulic circuit;
a second hydraulic actuator in the hydraulic circuit, in fluid communication with at least one of the plurality of working chambers and comprising a second movable component, such that, in operation, the second hydraulic actuator receives energy from the hydraulic circuit to move the second movable component;
an energy storage component;
a plurality of routing valves in the hydraulic circuit for selectively routing the hydraulic fluid between one or more of: at least one of the plurality of working chambers; the first hydraulic actuator; and the second hydraulic actuator; and the controller of claim 1.

18. The hydraulic apparatus of claim 17, wherein the hydraulic apparatus is a forklift.

19. A method of controlling a hydraulic apparatus, the hydraulic apparatus comprising:

a prime mover;

a hydraulic circuit through which hydraulic fluid can flow;

a hydraulic machine having a rotatable shaft in driven engagement with the prime mover and the hydraulic machine defining a plurality of working chambers in the hydraulic circuit, each working chamber being defined partially by a movable working surface mechanically coupled to the rotatable shaft, such that, in operation, the hydraulic machine exchanges energy with the hydraulic circuit and the prime mover by movement of the working surfaces and the rotatable shaft;

a first hydraulic actuator in the hydraulic circuit, in fluid communication with at least one of the plurality of working chambers and comprising a first movable component, such that movement of the first movable component causes the first hydraulic actuator to transfer energy to the hydraulic circuit; and a plurality of routing valves in the hydraulic circuit for selectively routing the hydraulic fluid between one or more of: at least one of the plurality of working chambers; and the first hydraulic actuator, the method comprising:

determining that an energy return criteria has been met by the first hydraulic actuator and, in response thereto, selecting at least one among a plurality of energy control strategies to transfer the energy from the first hydraulic actuator via the hydraulic circuit based on at least one operational characteristic of the hydraulic apparatus; and controlling at least one of the hydraulic machine and the plurality of routing valves to implement the selected at least one energy control strategy during movement of the first movable component, the movement of the first movable component in such a way as to meet the energy return criteria, wherein the plurality of energy control strategies comprises a first energy control strategy and a second energy control strategy, wherein the first energy control strategy comprises transferring energy from the first hydraulic actuator, via the hydraulic machine, to an energy consumer in torque connection with the hydraulic machine, wherein the second energy control strategy comprises transferring energy from the first hydraulic actuator to a low-pressure reservoir of hydraulic fluid in the hydraulic circuit, and wherein the at least one operational characteristic of the hydraulic apparatus comprises an indication of an expected energy recovery of one or more of the energy control strategies, wherein at a first time during movement of the first movable component in such a way as to meet the energy return criteria, a first subset of the plurality of working chambers of the hydraulic machine is in fluid communication with the first hydraulic actuator, and at a second time, different to the first time, during movement of the first movable component in such a way as to meet the energy return criteria, a second subset of the plurality of working chambers, different to the first subset, is in fluid communication with the first hydraulic actuator and a third subset of the plurality of working chambers, separate from any of the second subset, is in fluid communication with a further component in the hydraulic circuit.

* * * * *